Patented May 20, 1952

2,597,384

UNITED STATES PATENT OFFICE 2,597,384

PREPARATION OF COLLOIDAL BARIUM SULFATE

Herbert L. Sanders, Phillipsburg, N. J., assignor to General Aniline & Film Corporation, New York, N. Y., a corporation of Delaware No Drawing. Application November 27, 1948, Serial No. 62,427

6 Claims. (Cl. 252—313)

1

This invention relates to the preparation of colloidal aqueous solution of barium sulfate.

Finely divided barium sulfate is commonly employed as a filler for paper, as an extender for pigments, in the weighting of textiles, and as a shadow-forming material in X-ray photography. While powdered barium sulfate is suitable for many applications of the foregoing classes, stable colloidal solutions of barium sulfate in water can often be used to great advantage for the aforesaid purposes, particularly when uniform distribution is desired, when handling of the barium sulfate as a liquid affords convenience, and when it is desired to form non-colloidal barium sulfate at a particular stage of a series of operations. Colloidal solutions of barium sulfate offer much greater versatility in technical application than suspensions of finely divided non-colloidal barium sulfate.

Heretofore, preparation of colloidal barium sulfate in aqueous media was carried out by relatively expensive or complicated procedures, unsuited for commercial operations. For example, one method heretofore proposed involved reaction of aqueous alcoholic barium iodide with aqueous alcoholic cobalt sulfate ("Colloid Chemistry," J. Alexander, vol. 1, 1926, p. 89). Another method involved reaction of barium hydroxide with sulfuric acid in the presence of lithium citrate (Chem. Abstracts, 38, 1934, p. 1073). Colloidal barium sulfate was also prepared by grinding non-colloidal barium sulfate in a colloid mill with a protective material such as glucose to give stable solutions (Koll. Zts., 32, 1923, p. 149–154). All of these procedures require relatively expensive reagents, or tedious procedures, and hence have attained no substantial use in commercial practice.

It is an object of this invention to provide a simple and inexpensive method of preparing colloidal aqueous solutions of barium sulfate which remain stable indefinitely, and which are adapted for use in the various fields in which finely divided barium sulfate was previously used. Moreover, it is an object to provide colloidal solutions of barium sulfate which can be readily coagulated at will to provide finely divided non-colloidal barium sulfate at any desired stage of the process.

In accordance with my invention, colloidal aqueous solutions of barium sulfate are formed by adding an aqueous solution in water of a water-soluble neutral sulfate, particularly a sulfate having as its cation, an alkali metal or a monovalent inorganic nitrogen base having a molecular weight up to 40, to an aqueous solution in water of barium gluconate, the sulfate solution being added in such amount and with adequate agitation to avoid formation locally of any substantial excess of sulfate ions, as well as to avoid the presence of an excess of sulfate ions in the solution.

Barium gluconate solutions suitable for the preparation of colloidal barium sulfate in accordance with this invention are conveniently prepared by adding gluconic acid to a solution of barium hydroxide in water, the amount of gluconic acid added being preferably from 2–3 mols per mol of barium hydroxide, so as to yield solutions having a weakly acid to weakly basic reaction. The concentration of barium in the gluconate solution is preferably from 4–10%, while the concentration of the sulfate in the water-soluble sulfate solution is preferably 8–25%. The concentration of barium sulfate in the resulting colloidal solution thereof generally varies from 4–12%. Soluble sulfates which can be advantageously employed are sodium, potassium, ammonium and hydroxyl ammonium sulfates.

It has been found that addition of sufficient sulfate to form an excess of sulfate ions causes precipitation of barium sulfate. Accordingly, the amount of sulfate used is preferably not greater than 95% of the theoretical amount to convert all of the barium gluconate to barium sulfate. In this way, formation of local excess sulfate ions in mixing the two solutions can be readily avoided with sufficient agitation.

The colloidal barium sulfate solutions obtained in accordance with this invention are almost clear, having a brown coloration and a slightly opalescent appearance. They remain stable indefinitely at room temperature. A peculiar characteristic of the solutions is, that upon dilution with substantial amounts of water, e. g. sufficient to reduce the concentration of barium sulfate to 0.1%, the barium sulfate is entirely precipitated.

Formation of colloidal barium sulfate by the process of my invention is especially surprising in view of the fact that gluconic acid or glucose in an amount comparable with that used in accordance with the invention fails to prevent precipitation of aqueous solutions of barium chloride upon addition of inorganic sulfates.

The method of preparing colloidal barium sulfate according to my invention is illustrated in the following examples wherein parts and percentages are by weight.

*Example 1*

22 parts of barium hydroxide octahydrate $(Ba[OH]_2 8H_2O)$ were dissolved in 100 parts of hot distilled water, and added slowly to 80 parts of 50% aqueous gluconic acid. A solution of barium gluconate having substantially neutral reaction was obtained, containing about 0.93 mols of excess gluconic acid per mol of barium gluconate, the concentration of barium in the solution being about 4.7%. After cooling the barium gluconate solution to room temperature (e. g. 20–30° C.), a solution of 9 parts of hydroxylamine sulfate ([NH$_2$OH]$_2$H$_2$SO$_4$) in 50 parts of water was added slowly to the barium gluconate solution with vigorous agitation so as to prevent formation of any substantial local excess of sulfate ions. The amount of sulfate was 0.79 mol per mol of barium gluconate, and the concentration of the sulfate in the added solution was about 9%. An almost clear, brown, opalescent solution was thereby obtained containing 5% of colloidal barium sulfate. When maintained at room temperature, the solution remained completely stable at the end of a six-month period of observation.

The amount of hydroxylamine sulfate can be increased, for example, to 11 parts in the foregoing procedure (corresponding to 0.96 mol of sulfate per mol of barium gluconate), but if this proportion is substantially exceeded, precipitation of heavy non-colloidal barium sulfate ensues.

*Example 2*

30 parts of barium hydroxide octahydrate dissolved in 70 parts of water were added to 80 parts of 50% aqueous gluconic acid, yielding a solution of barium gluconate containing about 0.15 mol of excess gluconic acid per mol of barium gluconate, the resulting solution having a definitely alkaline reaction. The concentration of barium in the resulting solution was about 7.3%. A solution of 12 parts of anhydrous sodium sulfate in 25 parts of water were then added with vigorous agitation to the barium gluconate solution. The solution contained about 0.89 mol of sulfate per mol of barium gluconate, the concentration of sulfate in this solution being about 22%. An almost clear, brown, opalescent solution of colloidal barium sulfate was obtained having a stability similar to that of the solution of Example 1. Concentration of colloidal barium sulfate in the solution was slightly more than 9%.

Addition of a slight excess of sulfate ions to either of the solutions of the foregoing examples, or the addition of a considerable amount of water (e. g. sufficient to reduce the barium sulfate concentration to 0.1%) caused immediate and complete precipitation of non-colloidal barium sulfate.

As indicated above, the amount of water-soluble sulfate added to the barium gluconate is, in any case, less than an amount equivalent to the barium gluconate present in the solution, and for practical purposes, preferably does not exceed 95% of said equivalent amount. The concentration of barium in the gluconate solution is preferably 4–10%, and the concentration of sulfate in the added solution is preferably 8–25%. The barium gluconate solution contains at least 2 mols of gluconic acid radicals per mol of barium and preferably an excess of gluconic acid ranging up to 1 mol per mol of barium gluconate. The concentration of colloidal barium sulfate in the resulting solution is generally 4–12%. The reaction of the sulfates with the barium gluconate is carried out at a temperature of about 25–30° C.

Solutions prepared in accordance with this invention are useful in sizing and filling paper and textile fibers, in the preparation of pigments, and in shadow compositions for X-ray photography.

Variations and modifications which will be obvious to those skilled in the art, can be made in the details of the procedure outlined above without departing from the spirit or scope of the invention.

I claim:

1. A process for preparing colloidal aqueous barium sulfate solution which comprises adding an aqueous solution of a water-soluble sulfate selected from the class consisting of sulfates of alkali metals and monovalent inorganic nitrogen bases having a molecular weight of not more than 40, to an aqueous solution of barium gluconate while avoiding formation of a localized excess of unreacted sulfate ions, the amount of sulfate being less than the equivalent of the barium present in the gluconate solution, and the concentration of said solutions being sufficient to yield a final concentration of barium sulfate not substantially less than 4% and not substantially more than 12%.

2. A process for preparation of colloidal aqueous barium sulfate solution which comprises adding an aqueous solution of a sulfate selected from the class consisting of sulfates of alkali metals and monovalent inorganic nitrogen bases having a molecular weight of not more than 40, wherein the sulfate concentration is from 8–25%, to an aqueous solution of barium gluconate containing an excess of gluconic acid ranging up to 1 mol per mol of barium gluconate and wherein the barium concentration is 4–10%, while avoiding formation of a local excess of unreacted sulfate, the amount of sulfate being less than the equivalent of the barium present in the gluconate solution.

3. A process as defined in claim 2, wherein the concentration of barium sulfate in the final solution is 4–12%, and the amount of sulfate added is not more than 95% of the equivalent of barium present in the gluconate solution.

4. A colloidal aqueous solution of barium sulfate containing water-soluble gluconates selected from the class consisting of gluconic acid, barium gluconate, and gluconates of alkali metals and of monovalent inorganic nitrogen bases having a molecular weight of not more than 40, said gluconates being present in an amount corresponding to between 2 and 3 equivalents per mol of barium sulfate.

5. A colloidal aqueous solution of barium sulfate containing a water-soluble gluconate of the class consisting of gluconic acid, barium gluconate, and gluconates of alkali metals and of monovalent inorganic nitrogen bases having a molecular weight not higher than 40, said solution containing an excess of gluconic acid, the amount of gluconates including the gluconic acid being between 2 and 3 mols per mol of barium sulfate.

6. A colloidal aqueous solution of barium sulfate wherein the barium sulfate is present in a concentration of 4–12%, said solution containing a water-soluble gluconate of the class consisting of gluconic acid, barium gluconate, and gluconates of alkali metals and of monovalent inorganic nitrogen bases having a molecular weight not higher than 40, said solution containing an excess of gluconic acid, the amount of gluconates including the gluconic acid being between 2 and 3 mols per mol of barium sulfate, and the solution containing at least 5% excess of barium in the form of its gluconate, based on the amount of barium contained in the barium sulfate.

HERBERT L. SANDERS.

REFERENCES CITED

The following references are of record in the file of this patent:

UNITED STATES PATENTS

| Number | Name | Date |
| --- | --- | --- |
| 1,644,446 | Rapp | Oct. 4, 1927 |
| 1,861,696 | Harth | June 7, 1932 |
| 2,028,575 | Torigian | Jan. 21, 1936 |
| 2,368,833 | Hermann | Feb. 6, 1945 |